(No Model.) 2 Sheets—Sheet 2.
J. BOYD.
CENTRIFUGAL MACHINE FOR TREATING GRAIN, &c.
No. 403,910. Patented May 28, 1889.
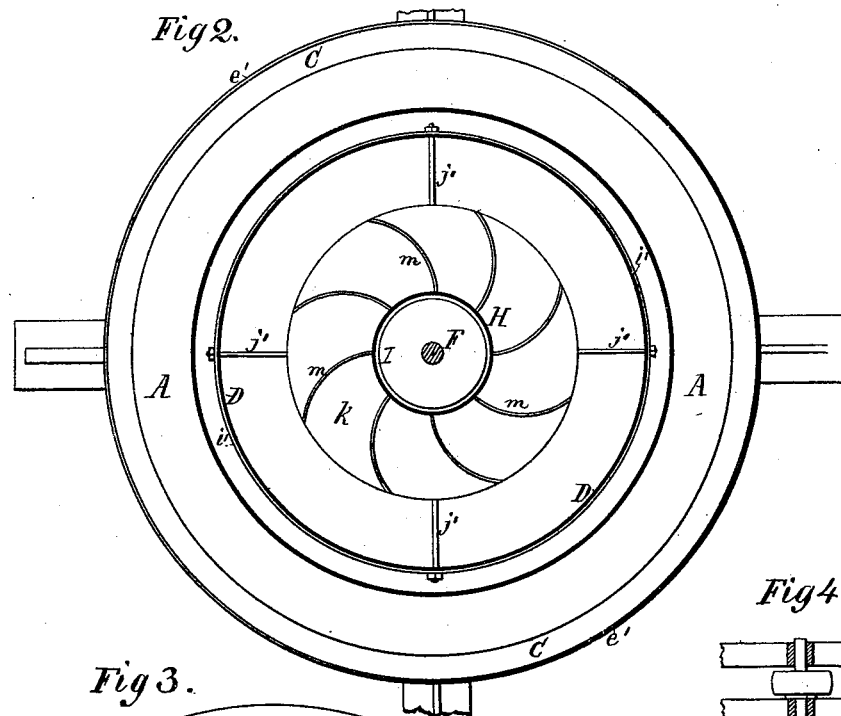
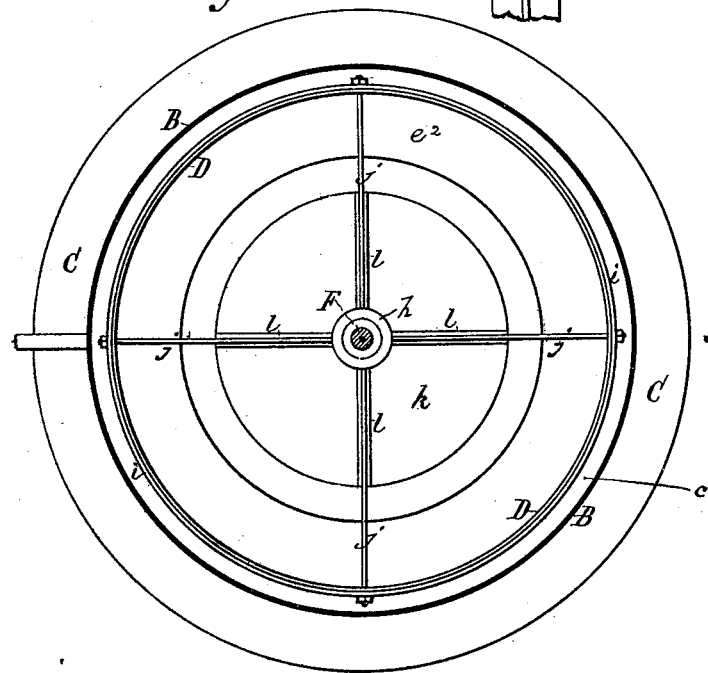
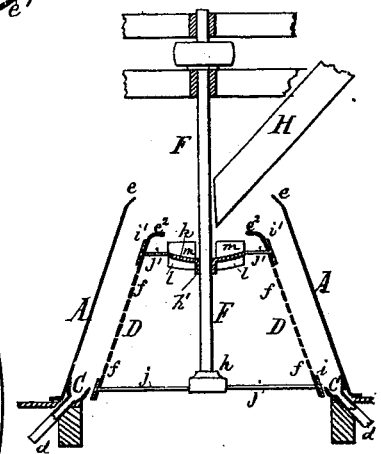
Witnesses:
E. T. Fenwick
G. M. Copenhaver
Inventor:
John Boyd
by his attys
Mason, Fenwick & Lawrence

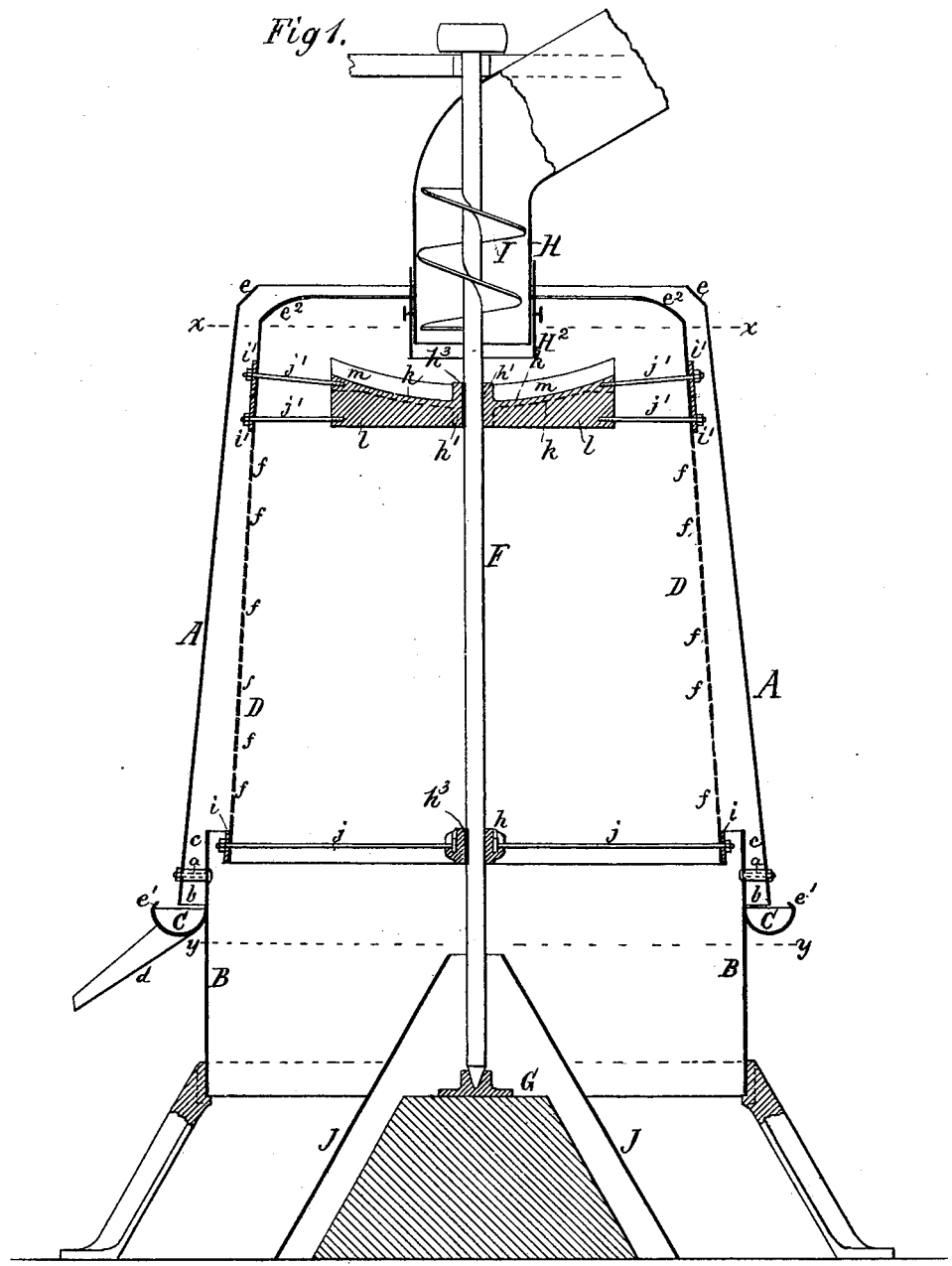

UNITED STATES PATENT OFFICE.

JOHN BOYD, OF BALTIMORE, MARYLAND, ASSIGNOR OF ONE-EIGHTH TO WILLIAM G. WHITE, OF SAME PLACE.

CENTRIFUGAL MACHINE FOR TREATING GRAIN, &c.

SPECIFICATION forming part of Letters Patent No. 403,910, dated May 28, 1889.

Application filed January 12, 1889. Serial No. 296,167. (No model.)

*To all whom it may concern:*

Be it known that I, JOHN BOYD, a citizen of the United States, residing at Baltimore, in the county of Baltimore and State of Maryland, have invented certain new and useful Improvements in Centrifugal Machines for Treating Grain, &c.; and I do hereby declare the following to be a full, clear, and exact description of the invention, such as will enable others skilled in the art to which it appertains to make and use the same.

My invention relates to a centrifugal drying and separating machine, its object being to produce a machine whereby the refuse mash from breweries can be so treated that the grain portion will be dried and separated from the liquid portion, and both of said portions caused to descend into appropriate separate receptacles, so that the grain portion thus reclaimed may be used as feed for animals, while the liquid portion may be returned to the vat as an additional product from the mash, the same machine being also applicable for treatment of distillers' swill, or the mash from distilleries, whereby the grain or meal is reclaimed as feed for animals, or for the treatment of refuse hops from a brewer's boiler to reclaim its liquor, or to the refuse of glucose or starch factories for the purpose of reclaiming the valuable constituents thereof, so that the same may be utilized as a merchantable product for feeding animals. By the accomplishment of these objects brewers, distillers, and other manufacturers, as well as the public, will be saved from many inconveniences, as the refuse from such establishments will no longer be regarded as a nuisance indictable under the laws. Enormous expense now incurred for carrying away the refuse will no longer have to be borne, and the health of man will not be jeopardized by the existence of such nuisances nor by the secret sale of mash and swill in its undried, soured, and unhealthful condition for animal food; and my invention consists in certain novel constructions, combinations, and arrangement of parts, whereby the above-mentioned objects are secured, as hereinafter described and specifically claimed.

In the accompanying drawings, Figure 1 is a vertical central section of my improved centrifugal mash-drying and grain and liquor reclaiming machine. Fig. 2 is a horizontal section (looking downward) of the same in the line $x\ x$ of Fig. 1. Fig. 3 is a horizontal section (looking upward) in the line $y\ y$ of Fig. 1. Fig. 4 is a vertical section showing a modification of the discharging end of the liquor-receiving jacket or case and of the feeding-spout, the feed-regulation screw being left off and the spout set in an inclined position.

A in the drawings designates an imperforated circular jacket or casing of truncated-cone form and open at top and bottom. This casing or jacket is bolted at its flared bottom edge by spaced bolts $a$ to a strong cylindrical skirting, B, of less diameter than said flared bottom edge, so that a space, $b$, exists all round between it and the skirting, which space is only interrupted at intervals by the bolts $a$. The skirting has its upper end extended some distance into the jacket, so as to form with the jacket a chute-space, $c$, for conducting liquor out of the lower end of the jacket A. Below this chute a V or other suitably shaped chute, C, is attached to the skirting, said trough extending all around the skirting and being provided with one or more discharge-pipes, $d$. At the upper edge of the jacket an inwardly-turned guard-flange, $e$, is formed, a similar flange, $e'$, being provided on the upper edge of the trough C, near the lower end of the jacket, for turning the liquor downward. The jacket and the skirting may be constructed upon a foundation and within a strong supporting-frame in any approved manner, so as to remain in a fixed position. Such mode of mounting cylinders and jackets being common and merely mechanical, the same may be varied from the way shown in the drawings.

Within the jacket A a cylinder, D, of preferably truncated-cone form, is arranged. This cylinder or cone is open at both ends and provided with punctures or passages $f$ all over its periphery and extending entirely through the metal of which the same is made, and the punctured surface may be covered with finely-woven wire or perforated metal, and over this metal surface a silk or other fabric may be applied. This cone at its top is formed with an inward-turned flange, $e^2$, for insuring the descent of the entering mash. The diameter of all parts of the cone with respect to all parts of the jacket is much smaller than that of the jacket, so that a space, for instance, of about four inches is left all around between the cone and the jacket, which space may gradually widen downwardly, as illustrated.

At the bottom of the cone D a spider-hub, $h$, is provided, and the cone and spider-hub are united and stayed by a strong steel band, $i$, and screw-bolts $j$, as shown. Near the top of the cone another spider-hub, $h'$, is provided, and it and the cone are united and stayed by strong steel bands $i'$ and screw-threaded bolts $j'$. This spider is formed with a dished distributing-plate, $k$, between its hub and spaced radial screw-bolt arms, and upon the bottom of this plate strengthening-ribs $l$ are formed, and on its top curved distributing-ribs $m$ are provided. The cone is rigidly fastened by means of the hubs of its spiders and suitable keys, $h^3$, to a vertical revolving shaft, F, which has its lower end mounted upon a step, G, and its upper end secured in a suitable bearing.

It is far the better construction to make the parts A and D with a downward flare, as by this construction the centrifugal force will be downward, owing to the greater speed of the lower part of the cone in consequence of its greater diameter, and owing to this and the constantly-inflowing fresh supply of mash from above and the rapid revolution thereof by centrifugal force the reclaimed solid products are caused to become free from the surface of the cone after being deprived of their liquor, and their descent and discharge into a separate receptacle at the lower end of the machine secured, while the liquor also descends into a separate receptacle. Above the dished distributing-plate $k$ a vertical feed-tube, H, extending from the spout of a mash-vat, is arranged around the shaft and may be provided around its lower end with a sleeve, $H^2$, made adjustable higher or lower, so as to decrease or increase the amount of discharge between its lower edge and the distributing-plate. Within the tube H a feed-screw, I, is arranged, said screw being fastened upon the shaft, and by revolving with the same gradually and properly feeds the mash to the dished distributing-plate. The screw I may be dispensed with and the tube H may be set in an inclined position and discharge directly upon the plate, as illustrated in Fig. 4; and the trough C may be located between the jacket A and the cone and discharge through a pipe or pipes, as illustrated in Fig. 4.

I prefer the arrangement of the feed screw and tube shown in Fig. 1, and also the arrangement of the trough shown in the same figure, as thereby the regulation of the feed is better, and more ready access for cleaning the trough C is afforded. A guard, J, of conical form may be placed around the lower part of the shaft and its step for giving an outward direction to the discharging dried grain product.

In operating with my apparatus the cone is set in rapid revolution, the mash let out of the vat and fed down upon the distributing-plate $k$, and by centrifugal force and the curved ribs of said plate evenly and forcibly distributed upon the inner periphery of the perforated cone, and during the revolution a superior body of air is caused to enter the cone at the top, which air in connection with centrifugal force presses the descending mash downwardly and outwardly against the perforated surface of the cone, and forces therefrom the moisture or liquor through the perforations into the space between the cone and the jacket A, and keeps it in contact with the surface of the outer jacket while it is descending into the trough C, thus drying the grain or meal portions of the mash and separating the liquor therefrom and insuring its descent into said trough. During its operation the dried lighter portion of the mash is displaced by the incoming heavier mash from above, and it descends by the downward centrifugal force through the bottom of the cone into a receiver below the skirting B, while the liquor flows down through the chute-space $c$, formed by the jacket and skirting, into the trough C, and is discharged into a proper receiver.

As one preferable mode of constructing the cone D, it may comprise a base of strong plate metal having perforations over its periphery of, say, about one-quarter of an inch in diameter, and over the surface of this conical base portion finely-woven wire or perforated metal may be placed, and over this wire or perforated metal surface strong silk or other suitable fabric may be applied.

This machine may be suspended by suitable supports or journals at the top of the shaft F, thereby dispensing with a step at bottom; or the step G may be a loose fitting, simply for keeping the shaft F in position.

I make no claim under this application to an inner cone which discharges the dried substances upwardly and over its upper edge into a surrounding jacket having a downward discharge-passage.

What I claim is—

1. In a centrifugal machine for treating refuse substances—as, for instance, mash—so as to dry the grain and separate the solid and liquid portions, the combination of the outer imperforated stationary jacket or case open at top and bottom, the inner perforated revolving cylinder or cone open at top and bottom, and an armed distributing-plate at the upper part of the vertically and freely discharging inner cone, substantially as and for the purpose described.

2. In a centrifugal machine for treating refuse substances—as, for instance, mash—the combination of the outer stationary jacket or case, A, open at top and bottom, the trough C, inner perforated cylinder or cone, D, open at top and bottom, shaft F, distributing-plate $k$ at the upper part of the vertically-discharging inner cone, skirting B, and chute-space $c$, formed by the outer jacket and the skirting, substantially as and for the purpose described.

3. In a centrifugal machine for treating refuse substances—as, for instance, mash—the combination of the skirting and its attached trough with the outer jacket, A, and the inner perforated revolving cylinder or cone, D, and armed distributing-plate $k$ at upper part of the downwardly-discharging inner cone, substantially as and for the purpose described.

4. In a centrifugal machine for treating refuse substances—as, for instance, mash—the inner perforated cylinder or cone provided with spider-hubs $h\ h'$, united to the cylinder or cone and stayed by metal bands and screw-bolts, and one of said spider-hubs being formed with a distributing-plate, $k$, having curved arms, substantially as described.

5. In a centrifugal machine for treating refuse substances—as, for instance, mash—the combination of the feed-spout, a feed-regulating screw, a revolving shaft, an inner perforated cone or cylinder, a revolving armed distributing-plate at the upper part of the downwardly-discharging inner cone, and an outer stationary cylinder or jacket, substantially as and for the purpose described.

6. In a centrifugal machine for treating refuse substances—as, for instance, mash—the combination of an outer jacket, a revolving perforated cone open at both ends, and a revolving distributing-plate at the upper part of the downwardly-discharging cone for supplying the mash to the surface of the revolving perforated cylinder or cone, substantially as and for the purpose described.

In testimony whereof I hereunto affix my signature in presence of two witnesses.

JOHN BOYD.

Witnesses:
D. L. HOLDEN,
ED. RAINE.